United States Patent Office 3,826,635
Patented July 30, 1974

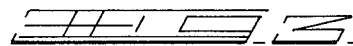
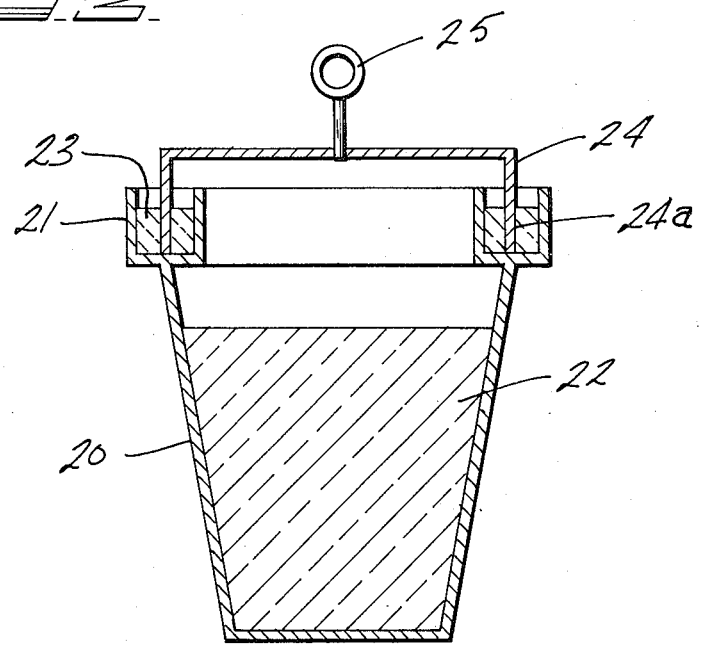
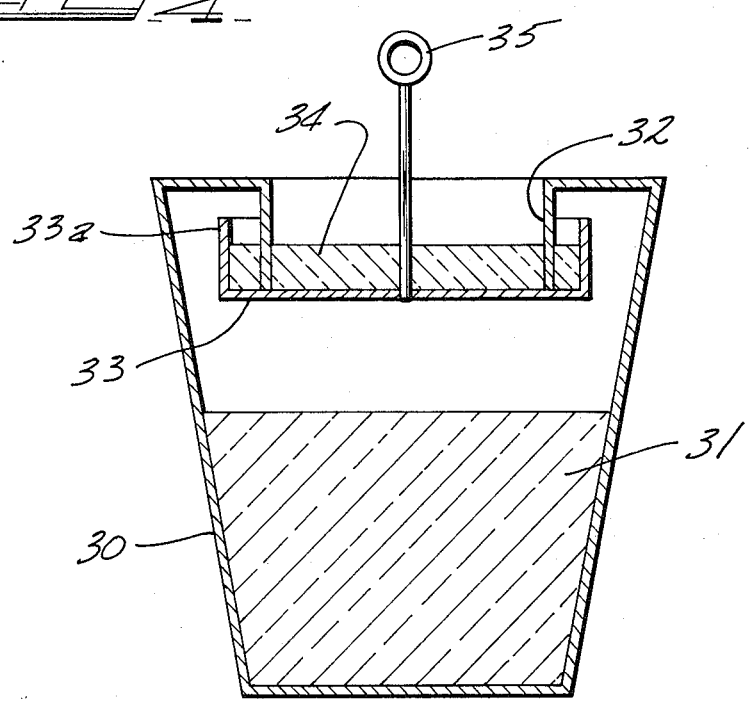

3,826,635
GLASS MELTING
Dallas P. Hall and Bulent E. Yoldas, Toledo, Ohio,
assignors to Owens-Illinois, Inc.
Filed Jan. 5, 1973, Ser. No. 321,290
Int. Cl. C03b 5/00, 5/08
U.S. Cl. 65—134                3 Claims

ABSTRACT OF THE DISCLOSURE

Disclosed is a glass melting technique, which improves glass homogeneity, wherein the vapor phase generated by the melting of the glass batch materials is confined in the vicinity of the glass melt by a liquid seal of molten glass. Preferably, the molten glass forming the liquid seal has substantially the same composition as the glass being melted.

---

Figure 1:
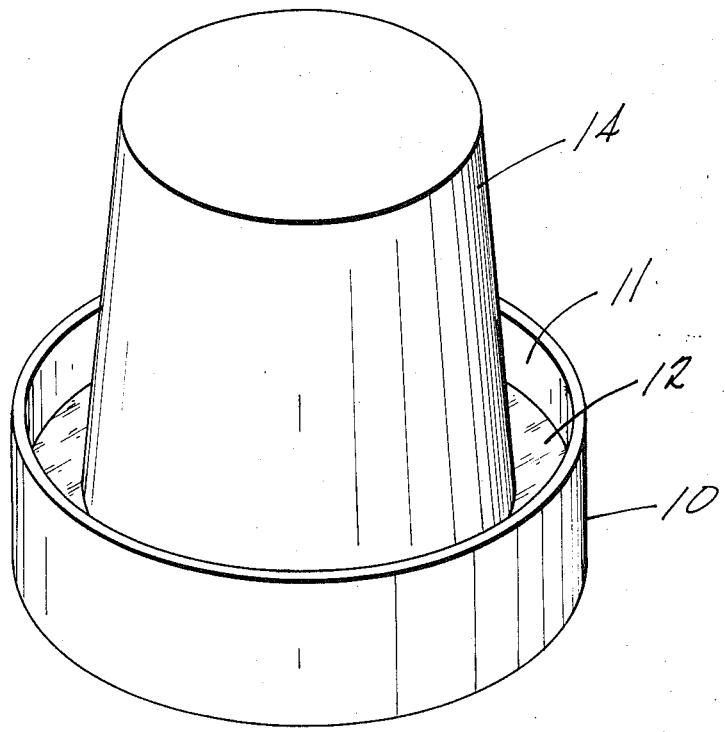

This invention concerns a specific melting technique for producing glass compositions of improved homogeneity and uniformity. High quality optical glass compositions and glass compositions for specialized application such as lasers, electrooptic devices, magnetooptic devices and acoustooptic devices must be homogeneous, uniform and free from the usual defects associated with melting. Such high standards of quality are approached for some compositions using the commonly employed melting techniques, although homogeneity continues to be a problem for glass compositions prepared from batch material including relatively volatile components such as $B_2O_3$, $Li_2O$, $ZnO$, and $F_2$.

Glass inhomogeneities can manifest themselves as surface defects called "cords" or striae. These striae are predominantly thread-like or cord-like vitreous inclusions in the surface of a base glass which are formed by localized compositional variations. Striae differ in index of refraction, chemical durability and other chemical and physical properties from the base glass and are undesirable where glass homogeneity is required.

Striae can be detected by visually observing the glass sample. One rather qualitative test for striae is the so-called shadowgraph test where the glass sample under observation is placed between a point source of light and a viewing screen. The light beam passes through the glass sample and the striae are "projected" on the screen as a shadow. This shadowgraph method also detects such striae which formerly were hardly or not at all detectable by viewing with the naked eye against a light-dark boundary.

The preparation of glasses with little or no striae from small melts has long been a serious problem to glass technologists. For some glass compositions, simple melting and stirring of the batch materials yields glass having good homogeneity. For some others, an additional step of fritting the batch materials followed by remelting in open vessel is sufficient to produce a glass with very little striae. This is usually true for glasses exhibiting moderate to high fluidity and low volatility at the melting refining temperatures. Glasses melted from batch materials containing volatile components such as $Li_2O$, $B_2O_3$, $ZnO$ and $F_2$ do not lend themselves to this technique because surface losses from volatilization result in increasing inhomogeneity as the melting and refining time increases.

Attempts have been made to overcome such volatility problems by melting in vapor-tight containers. Such containers are economically impractical and cumbersome to use. This is especially true in the case of platinum vessels which are required for many specialty high quality glass compositions.

The present invention overcomes the surface volatility problem and produces glasses of improved homogeneity.

In attaining the objects of this invention, glass batch materials having relatively volatile components are heated in an open vessel at a temperature and for a time sufficient to yield a mass of molten glass. During melting, the opening in the vessel is covered with a vapor impervious cover and the interface between said cover and said vessel is immersed in a bath of molten glass separate from the batch being melted to confine the vapor phase over the surface of the molten glass. This technique tends to establish equilibrium between the vapor phase and the volatile components at the surface of the glass and prevents the formation of localized compositional variations in the glass surface.

In the embodiment of the invention illustrated in FIGS. 1, 2 and 3 described below, the cover is equipped with sealing surfaces extending beyond the dimensions of the opening in the melting vessel and the liquid seal is formed by immersing these sealing surfaces in a molten glass bath. In the embodiment of the invention illustrated in FIG. 4, the rim of the melting vessel is immersed in a bath of molten glass to define the liquid seal.

The important feature of the present invention is that the interface between the cover and vessel is immersed in a bath of molten glass. It is not important for the cover and vessel to be in actual contact so long as any interfacial gap therebetween is immersed in a molten glass batch. Thus, the term "interface" as used herein includes any such gap between the cover and vessel.

The term "relatively volatile components" has been used above and refers to those components which will disproportionately exist in the vapor phase at the prevailing glass melting and refining temperatures so that there will be a localized depletion of such components from the surface of the molten glass. Such volatile components include lithia, boria, zinc oxide, and fluorine and their precursor materials.

As an additional advantage, the present invention provides a "liquid seal" of molten glass which allows for the release of pressure in the event of an unusual evolution of gas.

In the usual practice of the present invention, the glass batch materials used for forming the molten glass seal are of substantially the same batch materials used for forming the glass melt being prepared so that the vapor phase generated by the melting of both glasses will be substantially the same.

The glass batch materials used in practicing present invention can be fritted or unfritted batch ingredients prepared from lime, soda ash, sand, borax, feldspar, nepheline syenite, magnesium carbonate, potassium carbonate, iron oxide, dolomite, sodium silicate, sodium hydroxide, potassium hydroxide, potash, fluorspar, barium carbonate, limestone, alumina, silica, and cullet in various proportions depending on the composition and properties desired. The above and other ingredients are all commonly known in the glassmaking art.

While the invention can be used with either fritted or unfritted materials, fritted batch materials are preferably employed in the interest of economy and efficiency because of the large volume of gaseous reaction products expelled by the melting of raw batch ingredients.

Figure 2:
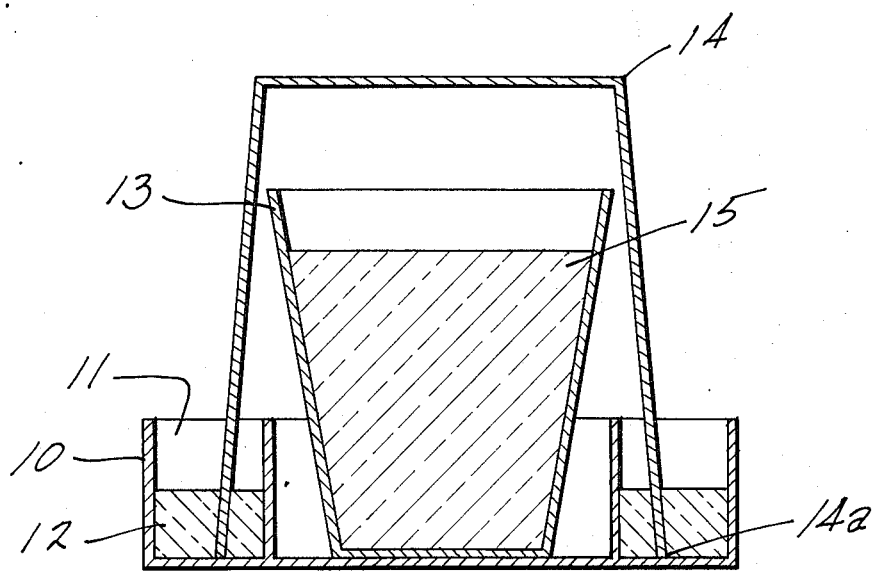

In the drawings, FIG. 1 is a perspective view of a typical laboratory application of the present invention; and FIG. 2 is a cross-sectional view of the embodiment of FIG. 1. FIGS. 3 and 4 are cross-sectional views of other embodimens of the invention.

In FIGS. 1 and 2, reference numeral 10 is a shallow cylindrical container equipped with an annular trough 11 which contains molten glass bath 12 which serves as the liquid seal. A melting crucible 13 is positioned upright in container 10 within the circular area defined by annular trough 11 and contains the molten glass 15 for the composition desired. A cover in the form of crucible 14 having sealing surfaces 14a is inverted over crucible 13 to cover and seal crucible 13 defining a vapor space thereover. Sealing surfaces 14a are immersed in molten glass bath 12 to enclose the vapor space over crucible 13. This confines volatile component over the surface the molten glass 15 in crucible 13 to prevent localized compositional variations therefrom. If there should be a sudden evolution of a large volume of gas from crucible 13, extreme pressure would be relieved through sealing bath 12.

In FIG. 3, 20 is a melting crucible equipped with an annular trough 21 positioned at the opening. Crucible 20 contains molten glass 22 for the composition desired. Annular trough 21 contains molten glass bath 23 which serves as the liquid seal. A cover 24 equipped with handle 25, having sealing surfaces 24a, covers and seals crucible 20 defining a vapor space thereover. Sealing surfaces 24a are immersed in molten glass bath 23 to enclose the vapor space over crucible 20.

In FIG. 4, 30 is a melting crucible containing molten glass 31 for the composition desired. The opening in crucible 30 is defined by downwardly extending rim 32. A cover 33 in the form of a shallow dish having a retaining sidewall 33a contains molten glass bath 34 which serves as the liquid seal. Cover 33 is raised into position by means of handle 35 so that rim 32 becomes immersed in molten glass bath 34 to enclose the vapor space of crucible 30. In this embodiment, the rim 32 functions as the sealing surface to enclose the vapor space.

In another embodiment not specifically illustrated in the drawings, the rim of the melting vessel can terminate in a flexible tube which can be immersed in a separate sealing bath.

Thus, it can be seen from the foregoing that the present invention can be practiced by a variety of techniques. The important feature is that the vapor space over the melting crucible be confined by a liquid seal of molten glass.

In the examples that follow, all parts are parts by weight, all percentages are weight percentages, and all temperatures are in degrees F. unless otherwise stated.

PROCEDURES

These examples utilize glass frits as the batch material to produce the glass compositions shown in Table I. The glass frits are obtained by melting raw batch ingredients in open crucibles and mechanically stirring to aid mixing. The theoretical composition data reported in Table I is based on the raw batch ingredients used to melt the frits. The frits are not actually analyzed except as reported in conjunction with Table II. The melted glass is then poured through water-cooled rollers and then quenched in water. This quenching yields glass frits having a particle size in the minus 4, plus 16 mesh size range.

Three hundred part batches of each frit are placed in a platinum melting crucible. The melting crucible is then nested inside of a large retaining crucible as shown in FIGS. 1 and 2 of the drawings and the annular trough defined by the outer wall of the melting crucible and the inside wall of the retaining crucible is charged with the same frit as is charged to the melting crucible. This eliminates possible detrimental effects due to either foreign constituents or a different proportion of similar materials. A sealing crucible having a diameter between that of the melting crucible and the retaining crucible is inverted over the melting crucible with its rim disposed in the annular trough of sealing glass frit to cover and seal the melting crucible. The three-crucible assembly is placed in a melting furnace and brought to melting and refining temperature of about 2600–2800° F. where the glass frit melted and the vapor phase over and the melting crucible is confined by the liquid seal of molten glass in the annular trough. After sufficient melting and refining time (about 24 hours), the crucible assembly is removed from the furnace, and allowed to cool slowly to room temperature. The crucible assembly is separated and glass samples are obtained by drilling similar core samples from each of the melting crucibles. These samples are then polished and examined visually and with a shadowgraph for striae.

As a control on the effectiveness of the present invention, identical "control" samples are melted in the same furnace in an open crucible and similar striae observations are made thereon. The samples are rated on an arbitrary scale of 0 to 10, with 0 representing a sample having substantially no visible striae on a shadowgraph and 10 representing the presence of many striae.

The results are presented in Table I and demonstrate that the present invention, by exposing the melting glass surface to only a small, confined atmosphere in equilibrium with the glass surface materially reduces the concentration of surface striae. As a result, glass quality is improved.

There is considerable variation in degree of improvement from composition to composition, with the greater improvement being present in those glass compositions having the higher proportion of volatile batch components.

TABLE I.—THEORETICAL GLASS COMPOSITIONS—WEIGHT PERCENT

| Example number | 1 | 2 | 3 | 4 | 5 | 6 |
|---|---|---|---|---|---|---|
| Oxide: | | | | | | |
| $SiO_2$ | 57.5 | 54.0 | 59.5 | 66.3 | 70.6 | 61.1 |
| $Al_2O_3$ | 15.7 | 30.3 | 25.2 | 4.7 | 1.4 | 1.6 |
| $Na_2O$ | 26.8 | 15.7 | 15.3 | | 14.2 | |
| $K_2O$ | | | | | | 17.4 |
| $Li_2O$ | | | | 15.1 | | |
| $B_2O_3$ | | | | | | |
| $P_2O_5$ | | | | | | |
| CaO | | | | 10.3 | 11.1 | 11.2 |
| MgO | | | | | 2.7 | |
| ZnO | | | | | | |
| BaO | | | | | | |
| $TiO_2$ | | | | | | |
| $ZrO_2$ | | | | | | |
| $F_2$ | | | | | | |
| $Cr_2O_3$ | | | | | | |
| $CeO_2$ | | | | | | .04 |
| $Nb_2O_3$ | | | | 0.5 | | |
| $La_2O_3$ | | | | 3.1 | | |
| $Yb_2O_3$ | | | | | | 8.4 |
| $Er_2O_3$ | | | | | | 0.3 |
| $Sb_2O_3$ | | | | | | |
| Compositional field | Soda alumina silicate | Soda alumina silicate | Soda alumina silicate | Lithia lime silicate | Soda lime silicate | Potash lime ytterbium silicate |
| Shadowgraph rating: | | | | | | |
| Invention | 0 | 5 | 1 | 0 | 0 | 3 |
| Control | 4 | 10 | 3 | 2 | 1 | 10 |

TABLE I—Continued

| Example number | 7 | 8 | 9 | 10 | 11 | 12 |
|---|---|---|---|---|---|---|
| Oxide: | | | | | | |
| $SiO_2$ | 33.4 | | 65.1 | 67.6 | 70.6 | 70.0 |
| $Al_2O_3$ | | | 1.9 | 20.9 | 19.9 | 19.8 |
| $Na_2O$ | | | 6.0 | 0.1 | 0.5 | 0.5 |
| $K_2O$ | 17.4 | | | | | |
| $Li_2O$ | | | | 3.8 | 3.5 | 3.5 |
| $B_2O_3$ | | | 27.0 | | | |
| $P_2O_5$ | | 56.3 | | | | |
| CaO | | | | 3.5 | 1.3 | |
| MgO | | | | | | |
| ZnO | | | | | | 1.9 |
| BaO | | 22.2 | | | | |
| $TiO_2$ | | | | 1.8 | 1.8 | 1.8 |
| $ZrO_2$ | | | | 2.0 | 1.4 | 1.5 |
| $F_2$ | | | | | 1.0 | 1.0 |
| $Cr_2O_3$ | | | | | | |
| $CeO_2$ | | | | | | |
| $Nb_2O_3$ | 49.2 | | | | | |
| $La_2O_3$ | | 13.3 | | | | |
| $Yb_2O_3$ | | 8.0 | | | | |
| $Er_2O_3$ | | 0.2 | | | | |
| $Sb_2O_3$ | | | | 0.3 | | |
| Compositional field | Niobium potash silicate | Barium lanthanum phosphate | Boro-silicate | Alumino-silicate | Alumino-silicate | Alumino-silicate |
| Shadowgraph rating: | | | | | | |
| Invention | 1 | 5 | 0 | 0 | 3 | 1 |
| Control | 2 | 10 | 4 | 4 | 10 | 3 |

Examples 1, 4, 5, 9 and 10 are essentially striae-free. Reduction in the escape of $B_2O_3$ vapor from Example 9 accounts for its improvement. Examples 2, 6, 8 and 11 show striking improvement in homogeneity. Volatility of soda from viscous soda-aluminosilicates is considered as less of a problem but a dramatic improvement is seen for Example 2. Example 3, which contains about the same amount of soda as Example 2, and Example 1 with a much higher soda content produce better quality glasses in open crucibles than did Example 2 in a sealed crucible. These results are not fully understood.

The soda-lime-silica (Example 5) and the lithia-lime-silicate (Example 4) produce fair glasses in open crucibles and, therefore, show only slight improvement to near optical quality in a sealed crucible. Example 8 also shows improvement but is very "cordy" in both the control and sealed melts.

Analytical data for a prolonged glass melting test of the glass of Example 12 at 2800° F. is presented in Table II and confirms that surface losses of ZnO and $F_2$ are substantially reduced by the invention. The analyses reported are obtained on the top ⅛" of glass sample. The frit used and the batch material contained 1.47% ZnO and 0.69% $F_2$.

TABLE II

| | Inventive melt | | Control melt | |
|---|---|---|---|---|
| Melting time (days) | 2 | 4 | 2 | 4 |
| Percent ZnO | 1.26 | 1.18 | 0.46 | 0.14 |
| Percent $F_2$ | 0.66 | 0.60 | 0.28 | 0.08 |

An additional benefit obtained from this melting system is that samples cool more slowly than in open crucibles and, therefore, fewer convection currents are set up within the melt.

Having thus described the invention, what is claimed is:

1. In the melting of homogeneous glass wherein glass batch materials having volatile components are heated in an open vessel at a temperature and for a time sufficient to yield a first mass of molten glass, and wherein vaporization of said volatile components from the surface of said first mass of molten glass results in surface striation from the localized depletion of said volatile components and the formation of a vapor phase enriched in said volatile components, the improvement for reducing said localized depletion comprising enclosing said open vessel with a vapor-impervious cover, and immersing the interface between said cover and said vessel in a second mass of molten glass having substantially the same composition as said first mass of molten glass to define a liquid seal confining said vapor phase over the surface of said first mass of molten glass.

2. The method of Claim 1 wherein said batch materials for said first mass of glass is in the form of a glass frit.

3. The method of Claim 2 wherein said glass frit contains $B_2O_3$, $Li_2O$, ZnO or $F_2$.

References Cited
UNITED STATES PATENTS 3,656,924  4/1972  Chapman et al. _____ 65—134
3,278,282  10/1966  Jaray _____ 65—1

S. LEON BASHORE, Primary Examiner

K. M. SCHOR, Assistant Examiner

U.S. Cl. X.R.

13—6; 65—134, 157, 347